June 18, 1968 E. ZUCKER 3,388,875

WEB TRANSPORT CONTROL ASSEMBLY

Filed Oct. 1, 1965 19 Sheets-Sheet 1

INVENTOR.
EDWIN ZUCKER

BY

ATTORNEYS

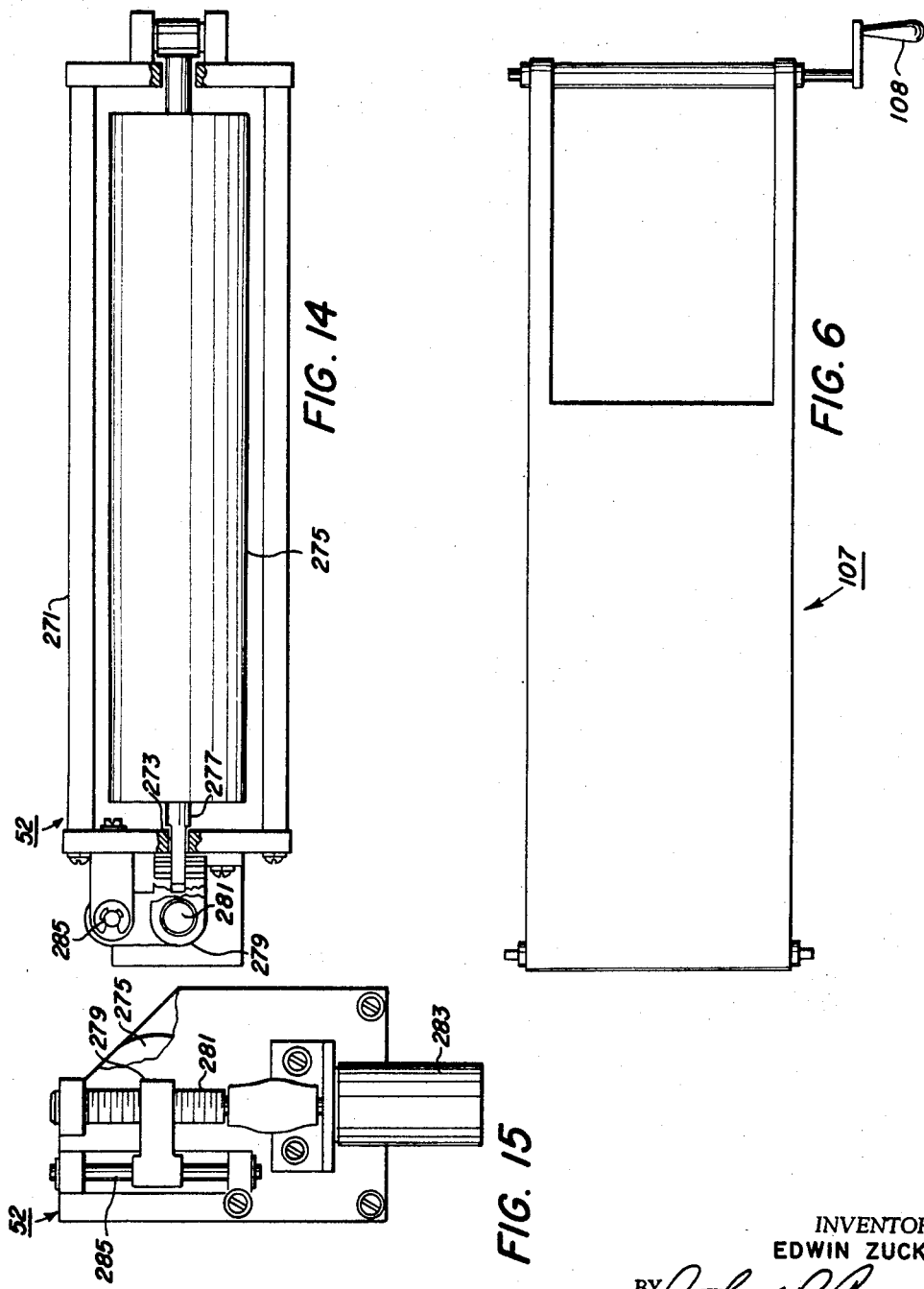

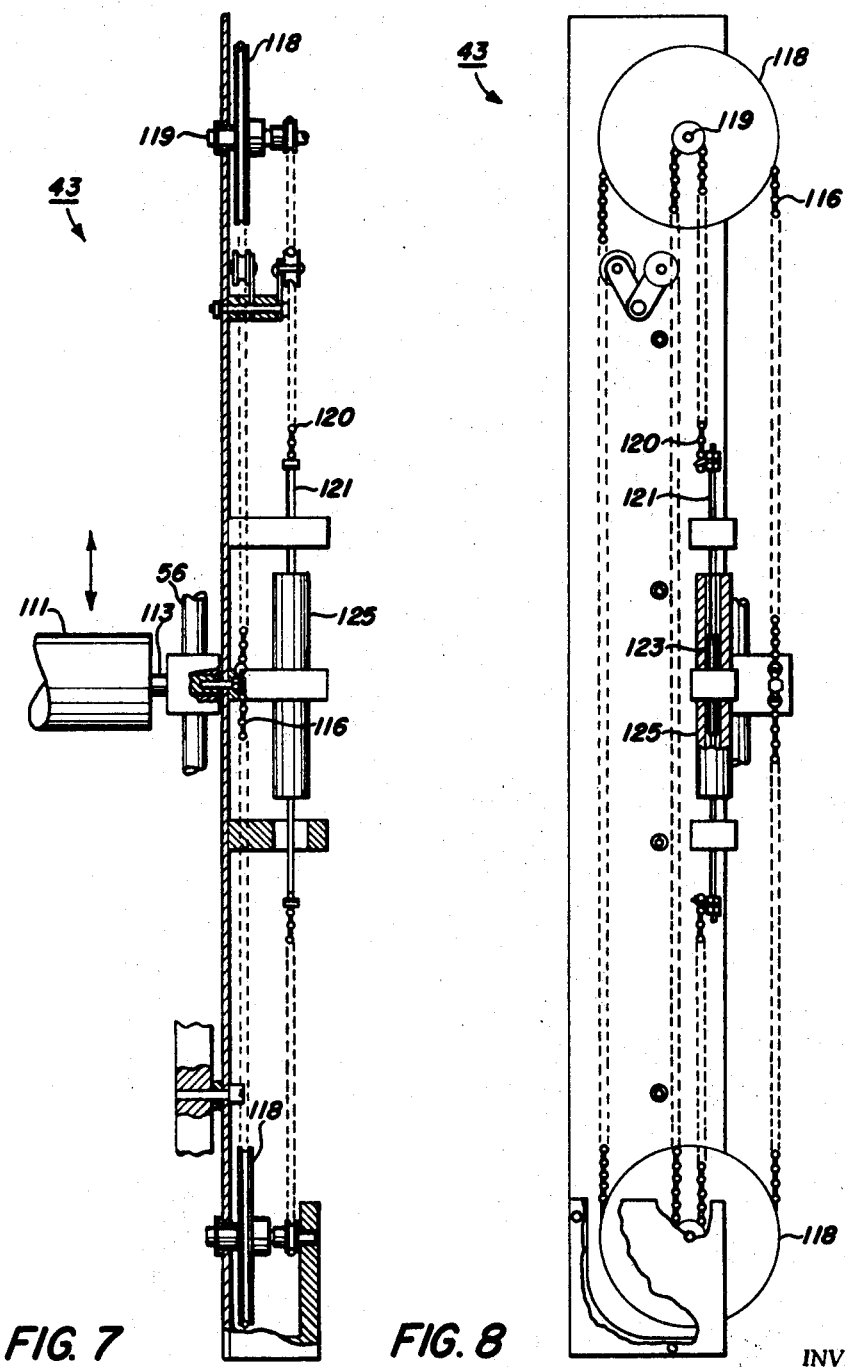

INVENTOR.
EDWIN ZUCKER

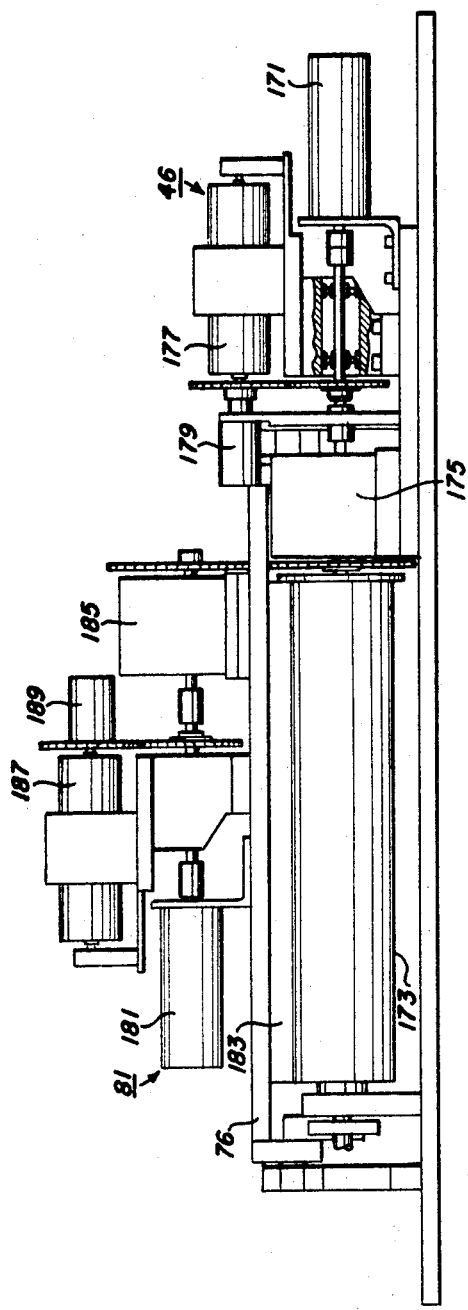

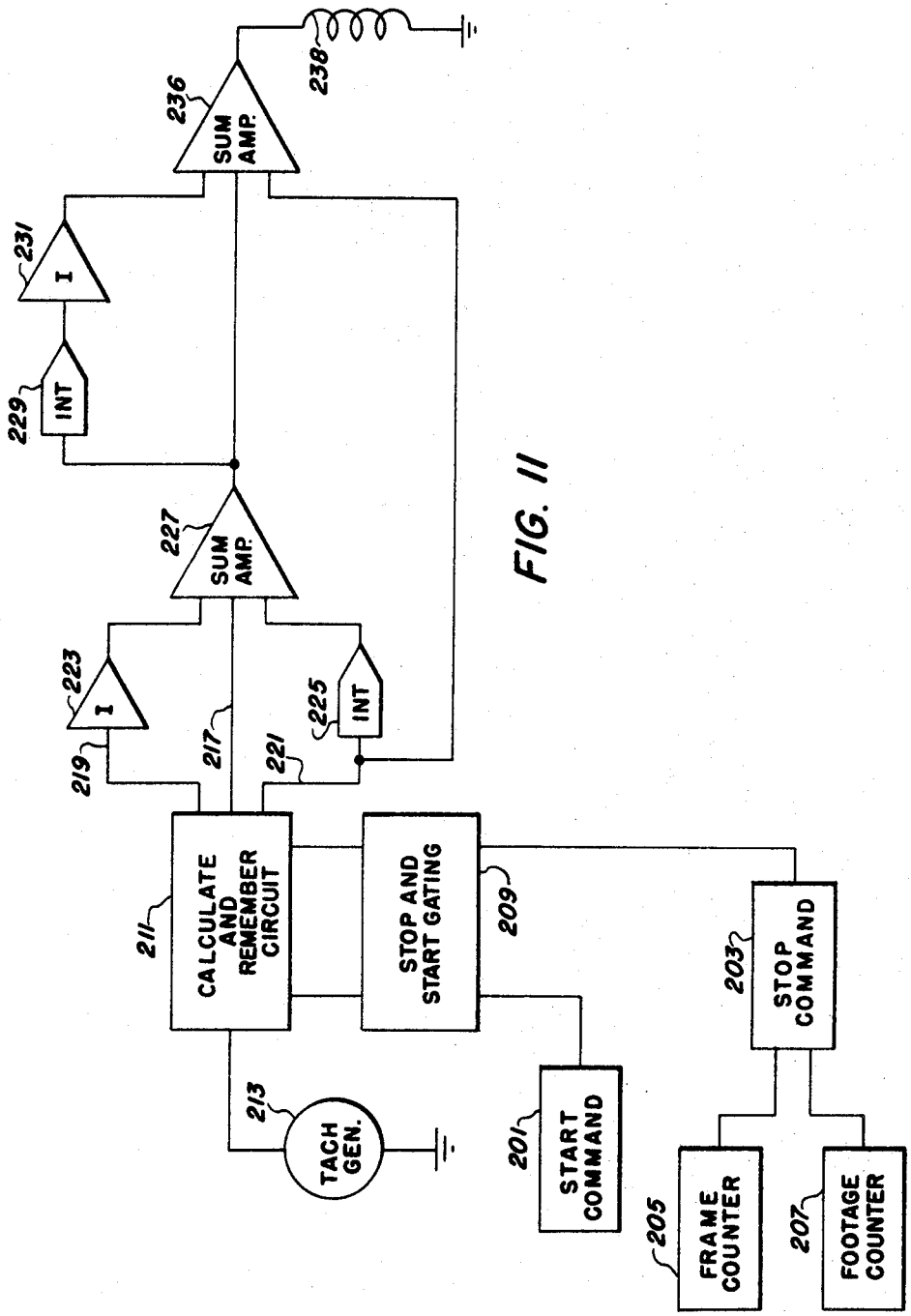

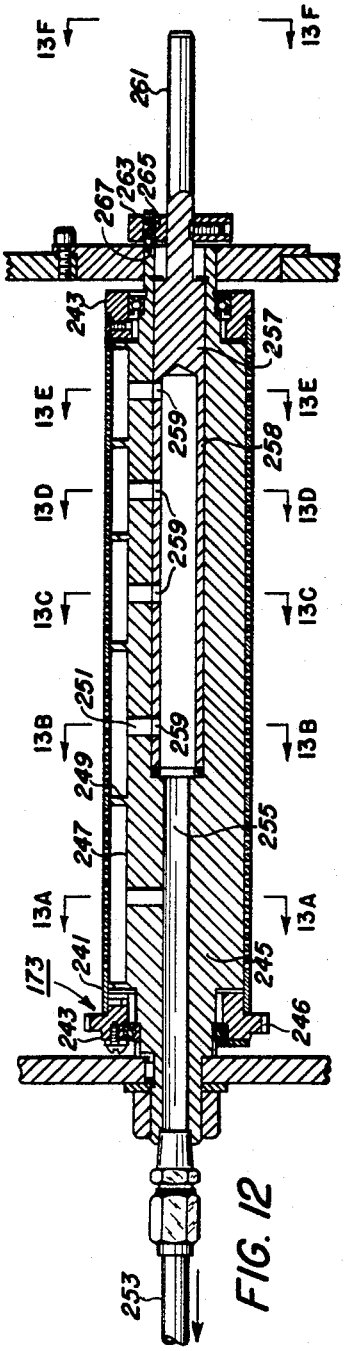

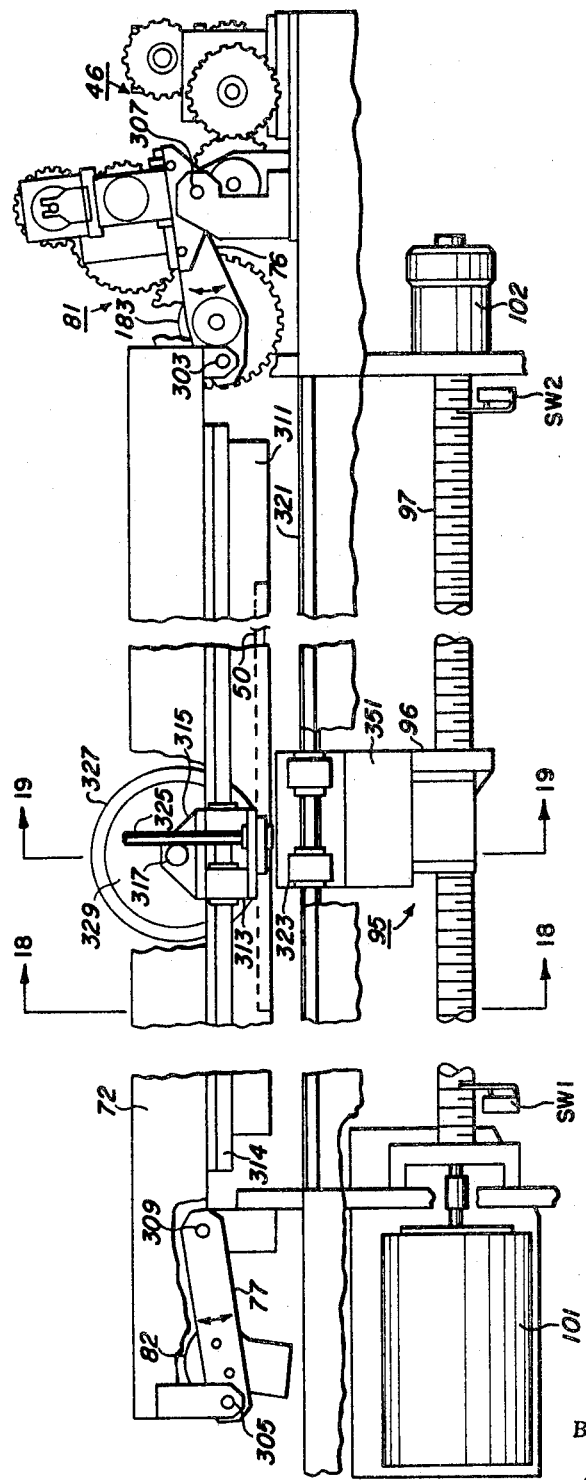

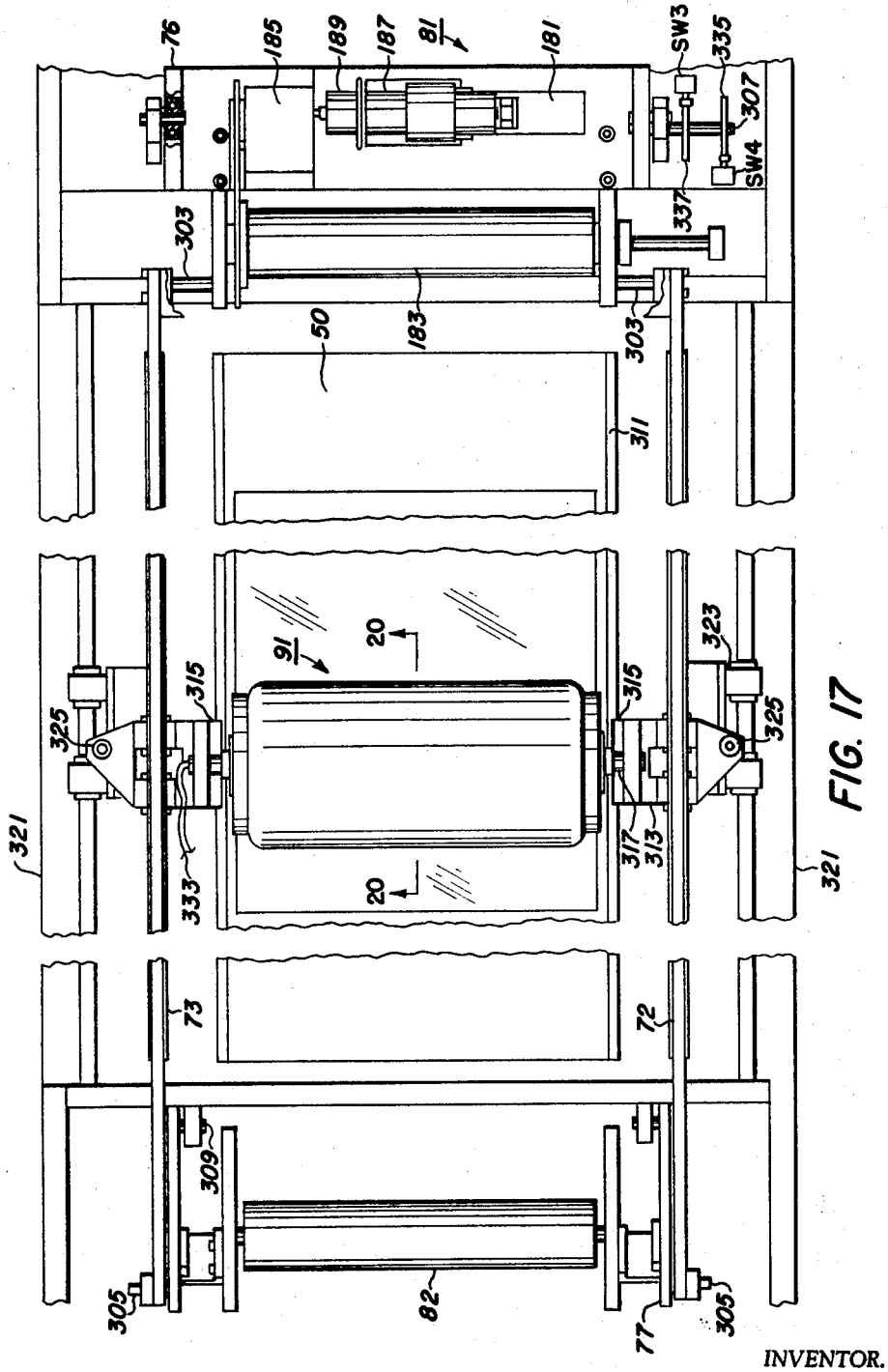

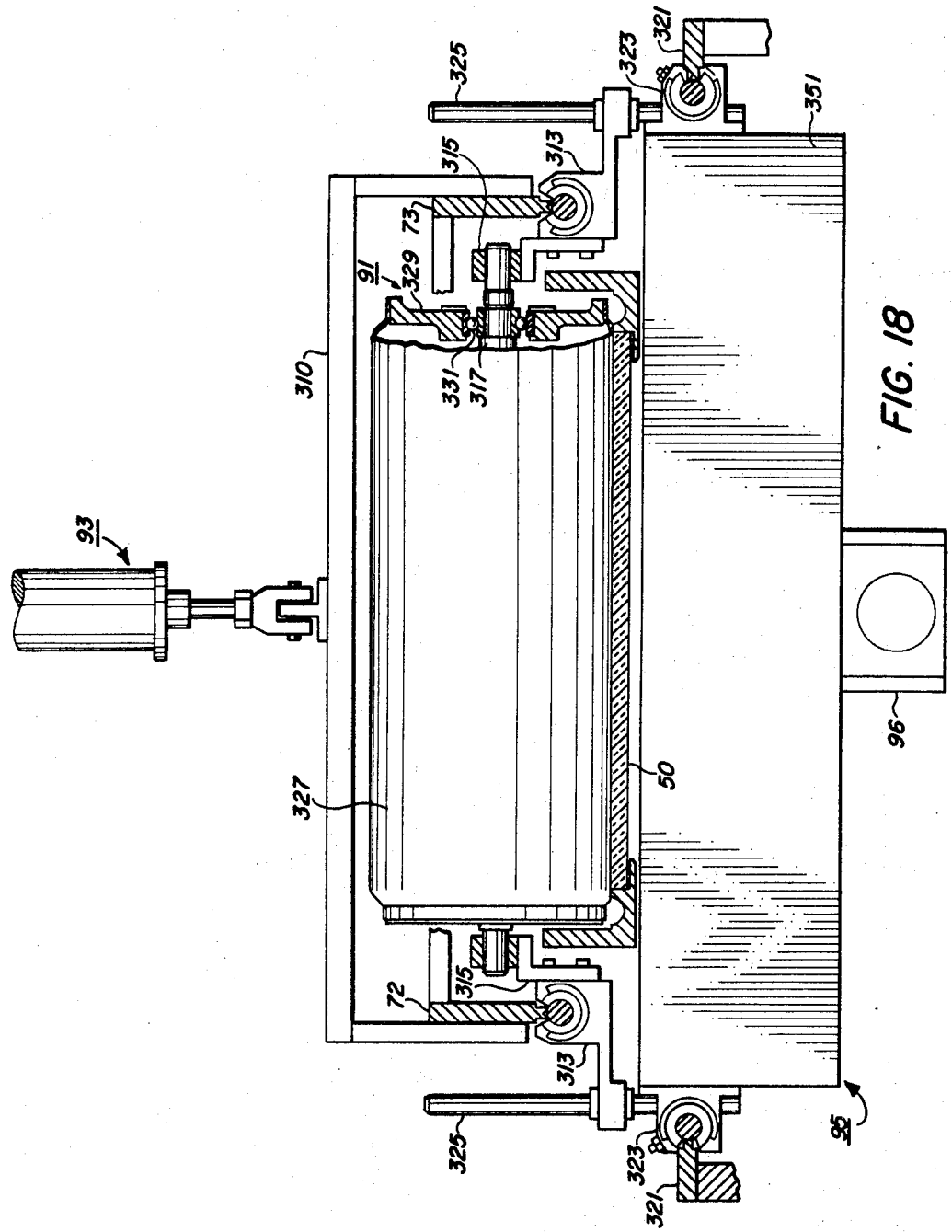

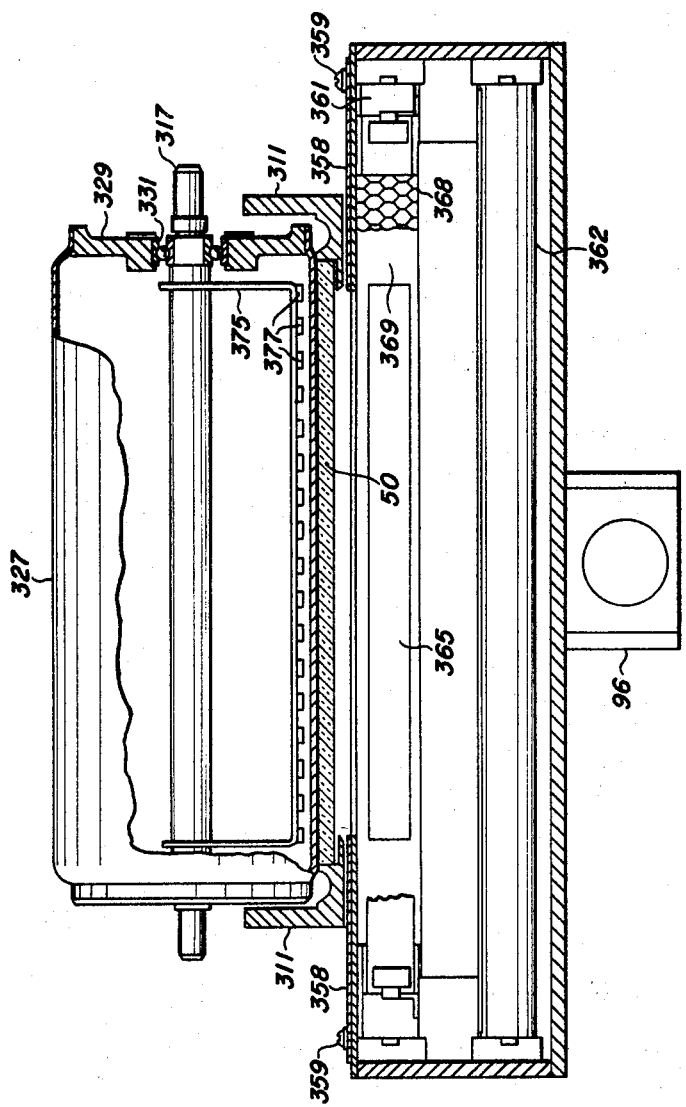

June 18, 1968  E. ZUCKER  3,388,875
WEB TRANSPORT CONTROL ASSEMBLY
Filed Oct. 1, 1965  19 Sheets-Sheet 18
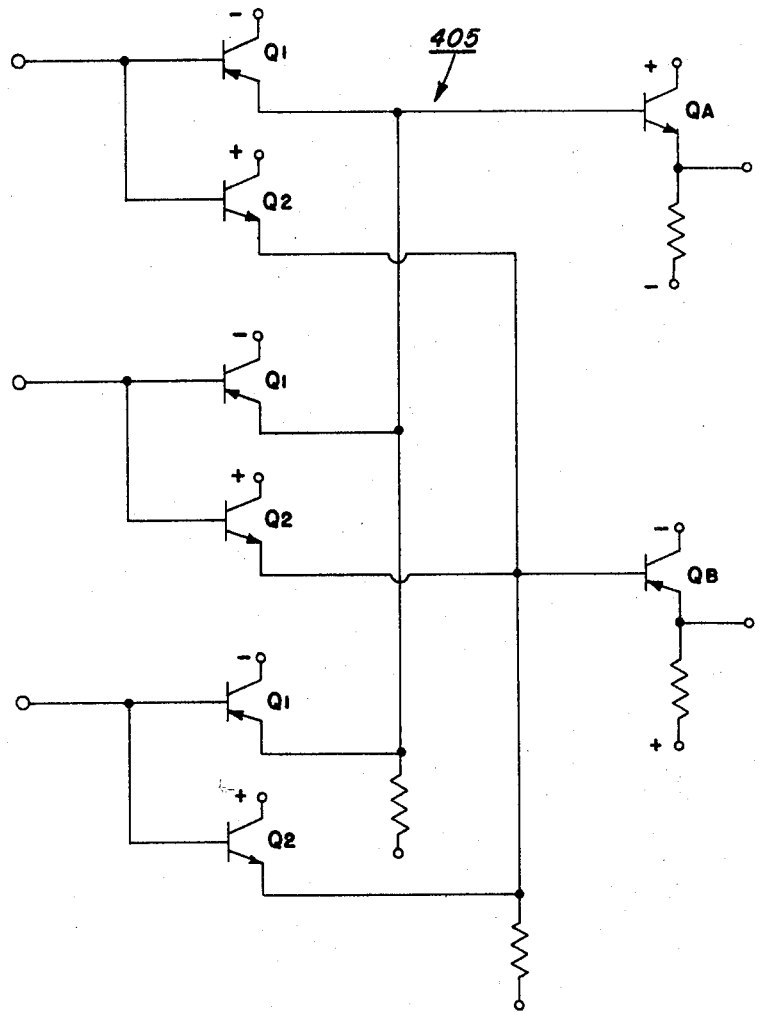
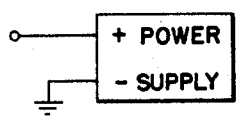
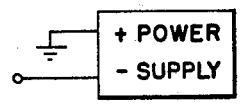
FIG. 22
INVENTOR.
EDWIN ZUCKER
BY
ATTORNEYS

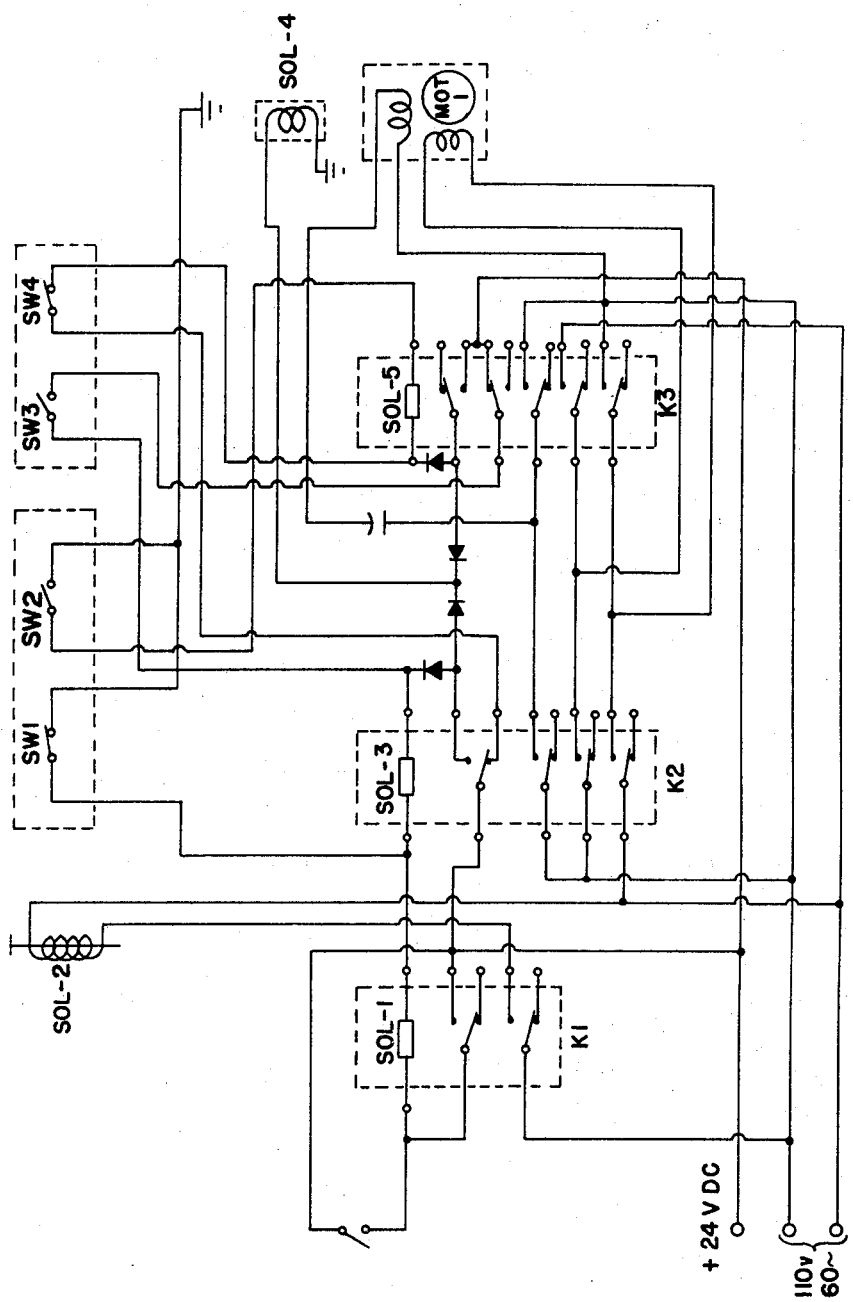

3,388,875
WEB TRANSPORT CONTROL ASSEMBLY
Edwin Zucker, Rochester, N.Y., assignor to Xerox Corporation, Rochester, N.Y., a corporation of New York
Filed Oct. 1, 1965, Ser. No. 491,991
11 Claims. (Cl. 242—75.51)

ABSTRACT OF THE DISCLOSURE

Apparatus for transporting web material over a printing zone in a contact printer in which the web material passes from one storage roll to another and is driven at high speeds by a capstan assembly in contact with the web material intermediate the two storage rolls. A pair of storage loop assemblies one associated with each storage roll forms a pair of loops in the web material which vary in response to the web material being advanced by the capstan assembly. As the storage loop assemblies are displaced, a responsive signal is generated to drive a torque motor which in turn rotates the respective storage roll to either increase or decrease the slack accordingly. A pair of rotational damper assemblies one associated with each storage roll provides a variable rotational damping force to the respective storage roll in response to the quantity of web material wound thereon.

BACKGROUND OF THE INVENTION

This invention relates to photography and, more particularly, to apparatus for transporting web materials in a contact printer.

In contact printing, as the name implies and as understood in the art, a sensitized duplicating film paper or the like is exposed on physical contact with the negative to be reproduced. As used herein, the term negative is intended to encompass a transparency in which the image can be either a negative or positive in a photographic to be made on a contact printer, it is necessary to employ a continuous feed system for both the duplicating material and the negative to be reproduced. It is common to thread photographic web materials, as, for example, film, from a supply spool to various directional idlers that help guide the film across the printing zone and onto a takeup spool. Normally, film advance and rewind are effected through a drive connected to the takeup spool and supply spool, respectively. Inherently, this technique for transporting film places undue stresses on the film which must undergo high rates of acceleration especially when reversing direction. It has been found that even slight stresses to delicate film, such as that used in aerial photography, tend to stretch or otherwise distort the image thereon and, therefore, detract from the degree of dimensional integrity required in this type of photography.

SUMMARY OF THE INVENTION

In accordance with the present invention, the film transport system is provided with an automatic tensioning assembly which maintains a predetermined storage loop at both the supply and receiving ends to allow for high rates of acceleration.

It is, therefore, an object of this invention to provide apparatus for transporting web materials at high rates of acceleration.

It is another object of this invention to provide apparatus capable of rapidly positioning photographic web materials in a contact printer.

It is still another object of this invention to provide proper tensioning for web materials transported at high rates of acceleration.

It is a still further object of this invention to provide a transport apparatus for web materials capable of rapid reversals without subjecting the materials to undue stresses.

These and other features and objects of the invention will be apparent from the following description and from the drawings.

BRIEF DESCRIPTION OF THE DRAWINGS

FIGURE 6 is a plan view of the window shade assembly;
FIGURE 7 is an enlarged view of the storage loop assembly with portions broken away to show internal structure;
FIGURE 8 is a front view of FIGURE 7;
FIGURE 10 is a view of the transport capstan assembly;
FIGURE 11 is a block diagram of the system for starting and stopping the film transport;
FIGURE 12 is a longitudinal sectional view of the film drive support;
FIGURES 13A through 13F are sectional views of the film drive support taken along lines A—A through F—F, respectively, of FIGURE 12;
FIGURES 14 and 15 are a plan and side view, respectively, of the articulated idler assembly;
FIGURES 16 and 17 are side elevation and plan views, respectively, of the film gate assembly partly broken away to show internal components;
FIGURE 18 is an end view of the gate assembly taken along line 18—18 of FIGURE 16;
FIGURE 19 is a sectional view of the lamp house assembly taken along line 19—19 of FIGURE 16;
FIGURE 22 is a schematic electrical diagram of the separation amplifier for the exposure control system;
and
FIGURE 23 is an electrical circuit diagram of the scan drive and gate assembly.

DESCRIPTION OF THE PREFERRED EMBODIMENTS

Figure 1:
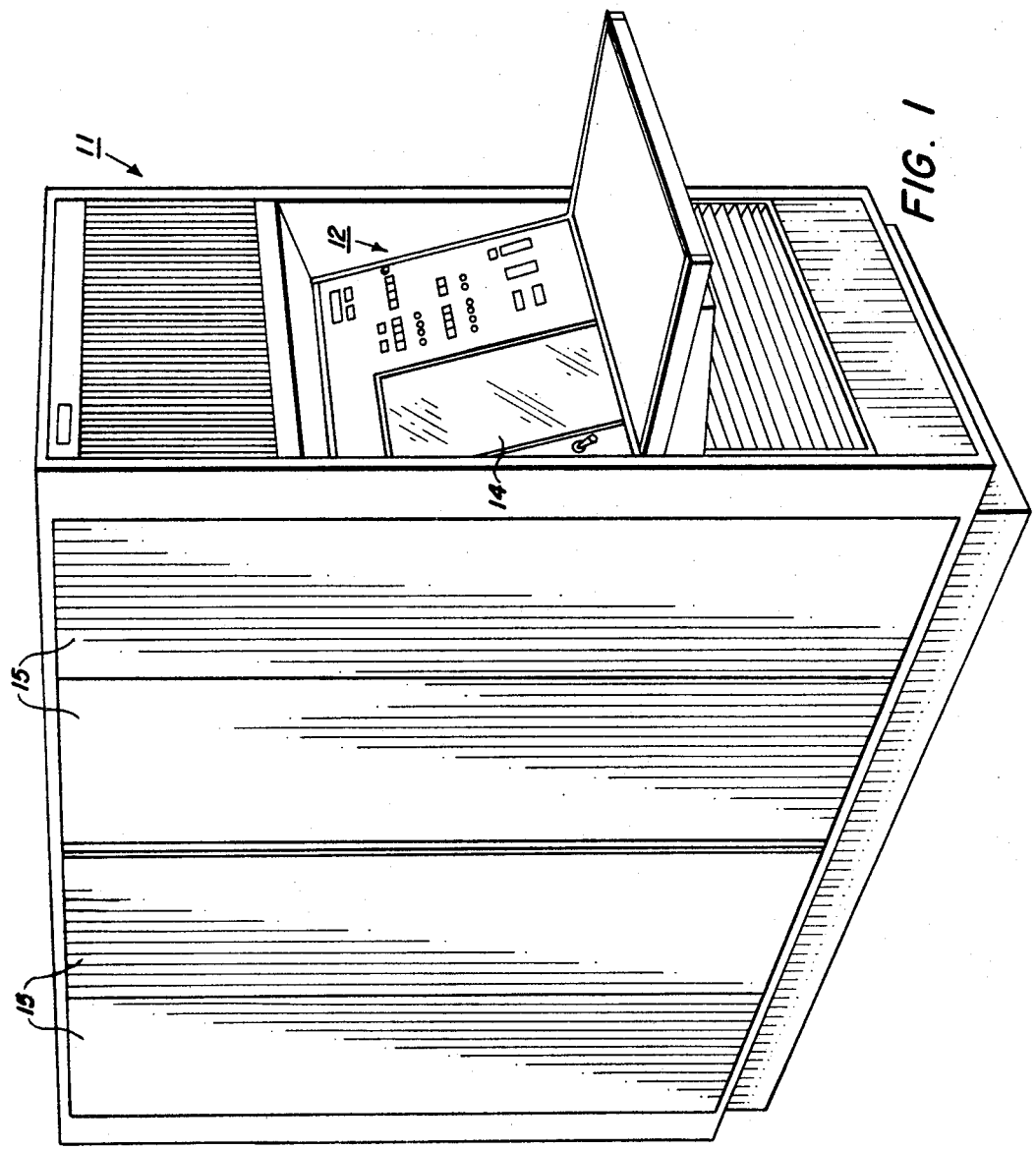
FIGURE 1 is a perspective view of the exterior of the contact printer apparatus hereof.

Referring now to FIGURE 1 of the drawings, the apparatus includes a cabinet 11 having a control panel 12 on which are mounted various selector knobs, buttons, and indicators used for controlling the operation of the machine. For example, certain controls are used to set the printing cycle, while others determine inputs to the automatic exposure control system in a manner which will become apparent. Observation by an operator of the frame position of the negative is obtained through a glass viewed 14 adjacent the control panel. The interior of the printer is protected from light entering through viewer 14 by a suitable light shield not shown. On the sides of the cabinet are sliding doors 15 through which entry may be made for loading the negative and duplicating material and for general servicing of the apparatus.

Figure 2:
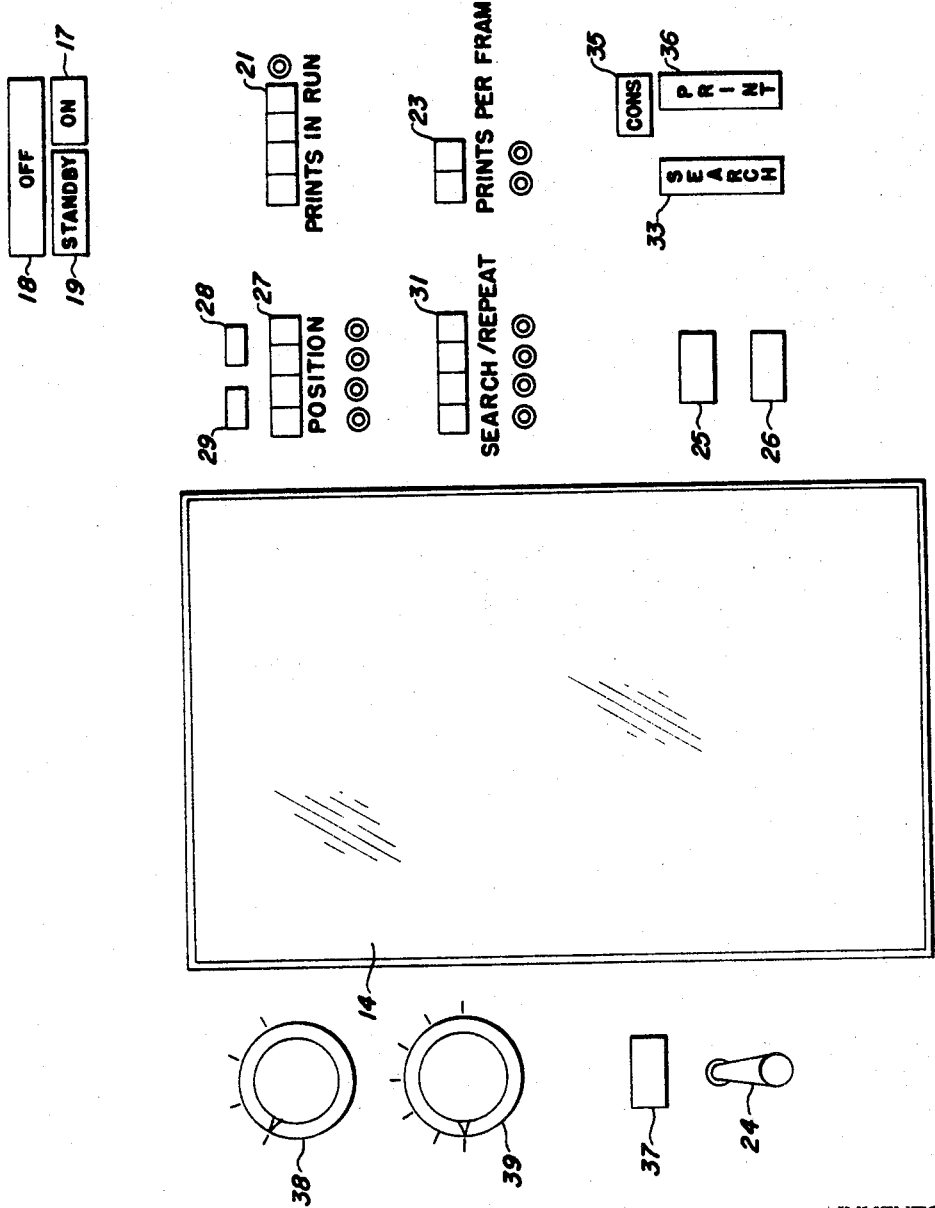
FIGURE 2 is an enlarged view of the control panel.

As best shown in FIGURE 2, control panel 12 has an ON button 17, an OFF button 18, and a standby button 19 which when depressed brings the machine to a controlled stop. Directly below these buttons are a prints-in-run counter 21 and a prints-per-frame selector 23 which indicate the total number of prints and prints for each frame, respectively. For manually positioning the negative film there is a lever 24 connected to a potentiometer that controls the drive of the film which can be observed through viewer 14. Also located on the panel are negative wind button 25 and rewind button 26 for rapidly positioning the negative film. A display counter 27 that is set at a reference datum indicates the portion of the negative at the viewer in either feet or frames from the preset reference. Metering of counter 27 in footage or frame numbers is determined by depressing buttons 28 and 29, respectively. A search/repeat counter 31 performs a dual function when the machine is in the automatic mode of operation. When setting the counter to the desired footage or number of frames which the operator wishes to displace the negative in the wind direction and then depressing search button 33, the desired footage or number of frames on the negative is displaced until the counter reads zero, at which time the machine reverts to standby condition. When used as a repeat counter, the desired number of frames which the operator desires to print consecutively is set on the counter. Upon depressing consecutive-print-button 35 and print button 36, the frame in the viewer is moved to the printing zone and becomes the first frame in the consecutive series. As the print cycle for each frame is complete, counter 31 counts down. When the counter reaches zero, the consecutive series printing is complete and the printer reverts to standby. On the reverse side of viewer 14 is a raw stock advance button 37 and rotary selectors 38 and 39 which determine inputs to the exposure control system for the particular duplicating film type and exposure, respectively.

Figure 3:
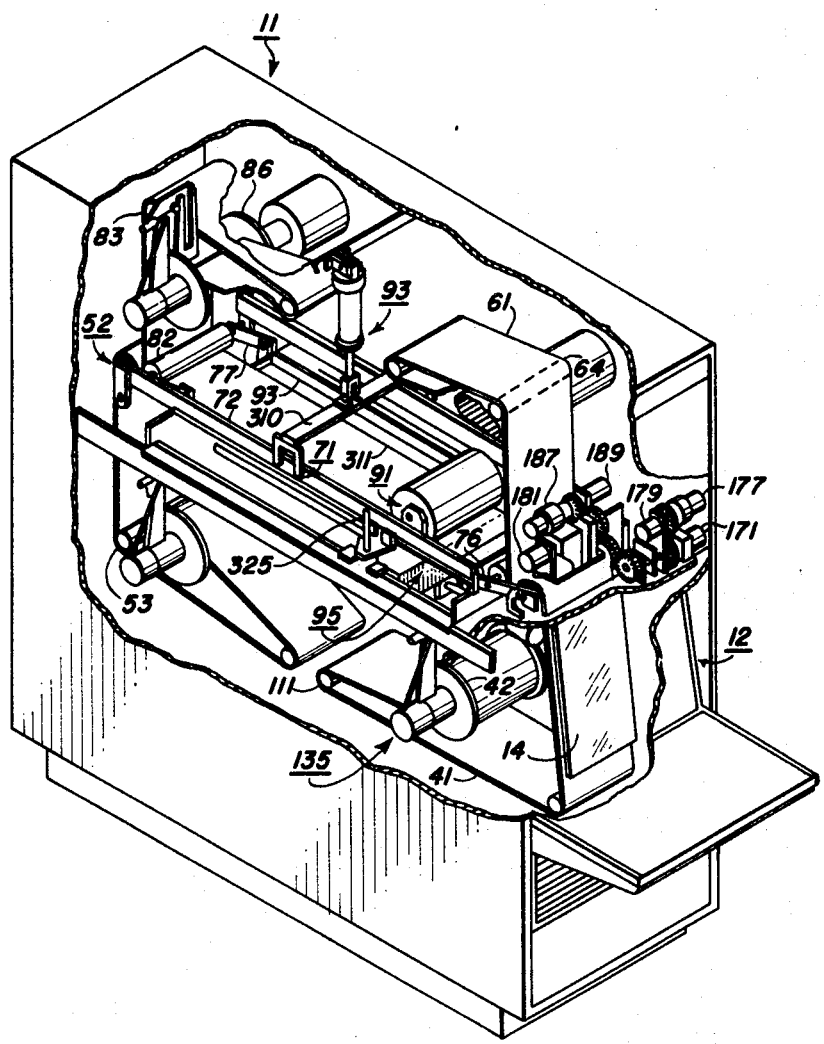
FIGURE 3 is an isometric view of the contact printer apparatus.
Figure 4:
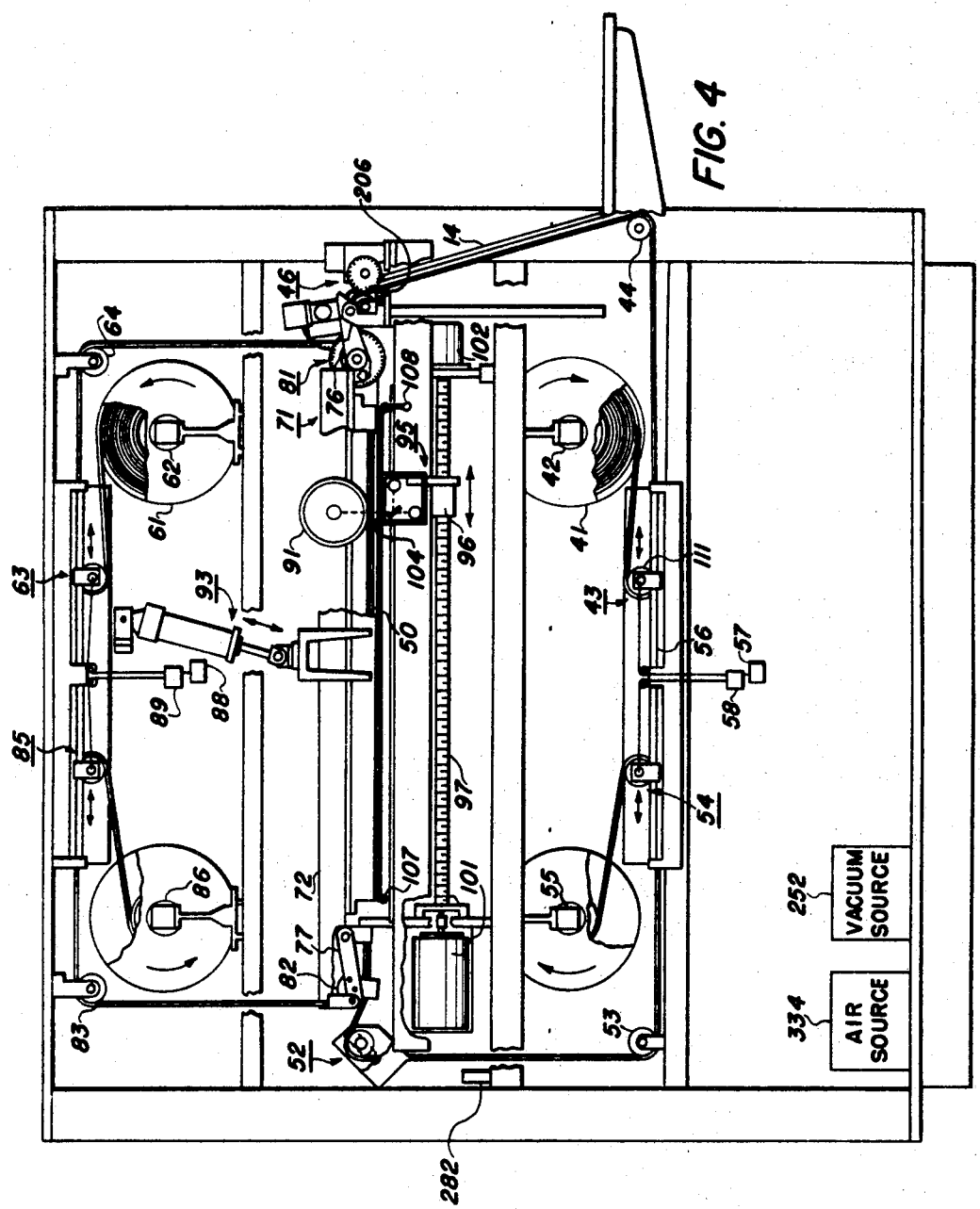
FIGURE 4 is a side elevation of the contact printer with the doors removed.
Figure 5:
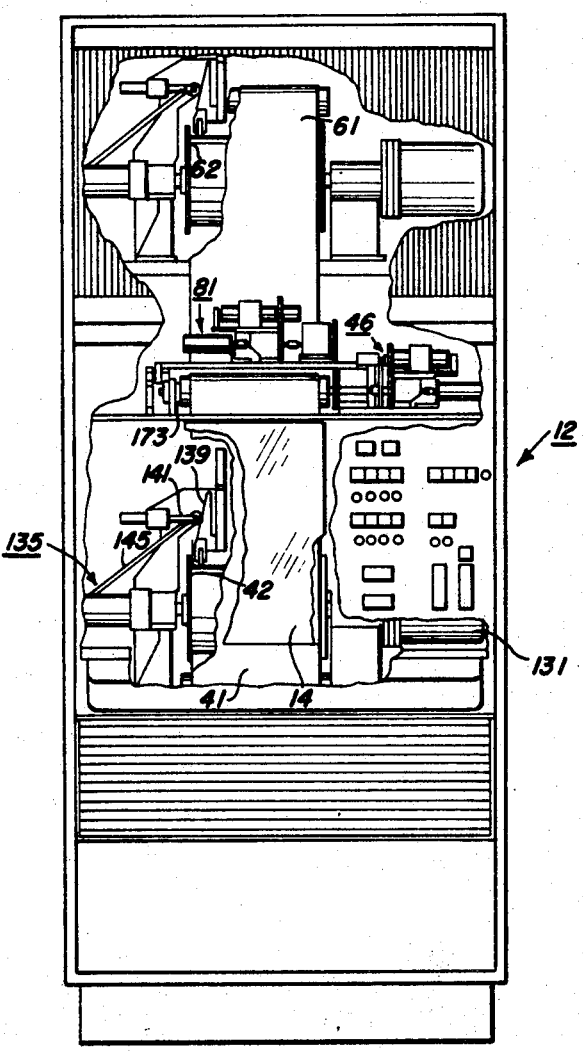
FIGURE 5 is an end view of the contact printer apparatus.

The overall apparatus, which can best be seen in FIGURES 3–5, is adapted for selectively reproducing images contained on a roll of negative film 41 extending through the lower portion of the machine. The film is threaded from its rotatable supply spool 42 around a storage loop idler 43 assembly and directed upwardly by another idler 44 past viewer 14 and onto a capstan assembly 46, which directs the negative 41 to an overlying position above glass platen 50. Supporting negative 41 at the opposite end of platen 50 is an articulated idler tracking assembly 52 which guides negative 41 downwardly onto an idler 53 directing it to another storage loop idler assembly 54 before it is received by takeup spool 55. As shown by dotted lines in FIGURE 4, each of the idlers in assemblies 43 and 54 is horizontally displaceable with respect to a pair of spaced guides 56 located on the sides of the printer that serve to support the idlers. Weights 57 and 58 are attached to storage loop idler assemblies 43 and 54, respectively, for maintaining them under a predetermined tension for a purpose to be described.

In similar fashion, in the upper portion of the apparatus there is contained a quantity of presensitized duplicating material 61, such as raw film stock, photographic paper, or the like, which is fed from a supply spool 62 to a storage loop idler assembly 63 and another idler 64 and then downward across a parallelogram assembly 71 formed by a pair of spaced apart parallel plate members 72 and 73 pivotally mounted onto the framework of the apparatus by a pair of U-shaped end plates 76 and 77. Duplicating material 61 is threaded across parallelogram assembly 71 by passing it over a capstan assembly 81, to be described, and an idler 82 mounted on end plates 76 and 77, respectively. Idler 83 guides duplicating material 61 across another storage loop idler assembly 85 before it is received onto its takeup spool 86. As in the case of the negative film, a pair of weights 88 and 89 exert a predetermined tension on idler assemblies 63 and 85, respectively.

Also mounted on parallelogram assembly 71 for horizontal movement thereacross is a cylindrical bag member 91 adapted during operation to be urged against the duplicating material 61 and to be advanced thereover during the exposure step, as will be described. Supporting assembly 71 from the printer framework is a pneumatic piston and cylinder assembly 93 which serves to move the assembly vertically toward and away from platen 50 about pivots on end plates 76 and 77. This permits bag 91 to remain displaced from negative film 41 while the latter is selectively positioned for exposure and enables placing the bag against the film during the exposure step.

Positioned below platen 50 extending the length thereof is an elongated lamp housing assembly 95 which rides on a ball nut 96 that is supported on a ball screw 97. Rotation of screw 97 is controlled by a reversible motor 101 and a releasable spring actuated brake 102 on the ends thereof. Upon rotating screw 97, a small linear increment of the negative 41 corresponding to the size of a transverse aperture slit 104 in the lamp housing is continuously exposed by a modulated light source in a manner to be described. A window shade assembly 107, which is best shown in FIGURE 6, is positioned below platen 50 to provide longitudinal masking along the platen by movement of crank 108. The width of platen 50 is masked by adjusting the length of aperture slit 104 in the lamp housing assembly as will be understood. Inflatable bag member 91 is secured to lamp housing assembly 95 so as to move synchronously therewith as the lamp house assembly scans negative 41 and duplicating material 61 whereby they are maintained in firm contact against platen 50, parallel and opposite the slit at the instant of exposure.

Film support and drive system

Both negative 41 and duplicating material 61 are transported to and from the printing zone by the operation of their capstan assemblies 46 and 81, respectively. In order to accomplish this at high velocities of operation without placing undue stress on the negative or duplicating material, a storage loop is provided for each of the spools. Each of the storage loops has a storage loop idler which provides the proper loop distance when positioned at the center of its respective guide rail. When the storage loop idler is displaced from the center of its guide, a responsive signal is generated to drive a torque motor which, in turn, rotates the supply spool to either increase or decrease the slack accordingly until the loop idler is appropriately repositioned for the loop storage. Since each of the storage loops operates in the same manner, a discussion of one of them will suffice for all four.

Figure 9:
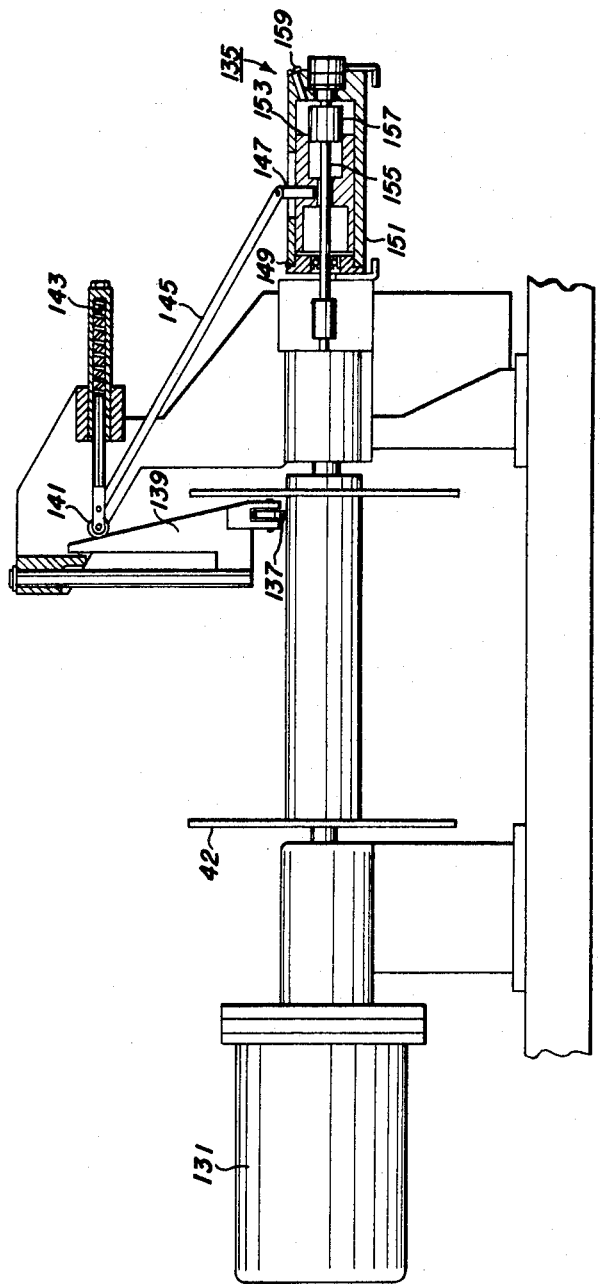
FIGURE 9 is a view of the variable coefficient damper assembly with portions broken away to show internal structure.

Referring to FIGURE 4 and as shown in detail in FIGURES 7 and 8, storage loop idler assembly 43 comprises an idler 111 that is displaceable along supporting guide 56. Connected to the shaft 113 of idler 111 is a bead chain 116 which is supported on a pair of rotatable sprockets 118. Mounted on the shaft 119 of sprocket wheels 118 is another bead chain 120 which has connected to it a rod 121 for supporting a core member 123 received by transformer 125. By this means, when the core member 123 is displaced relative to transformer 125, a signal is generated which is used to drive a reversible motor 131 connected to supply spool 42, as best seen in FIGURE 9, to either let out or take up negative 41 according to the direction of displacement of idler 111.

Associated with the drive motor 131 of spool 42 is a variable coefficient rotational damper assembly 135 which functions to compensate for the hunting action of idler 43. Since the inertia of spool 42 varies with the radius, i.e., length of negative 41 stored thereon for a given rate of withdrawal, damper assembly 135 provides a damping action for a continually changing inertia as the negative is withdrawn. To accomplish this, the damper assembly has a wheel 137 operable in conjunction with a vertically slidable cam plate 139, and positioned to ride on the top surface of negative 41. The camming surface of plate 139 abuts cam follower 141 which is spring biased by means of spring 143 at the opposite end thereof. Pivotally connected to cam follower 141 is an elongated rod 145 which is hinged to a member 147 protruding through a longitudinal slot 149 in the housing 151 of the damper assembly. Protruding member 147 is in locking relation with a displaceable sleeve member 153 which coaxially receives a damping shaft 155 mounted in driving relation with spool 42. It should be noted that shaft 155 is snugly received by sleeve member 153 about a larger circumferential portion 157. A threaded bolt 159 is provided to enable filling the damper housing 151 with a suitable viscous fluid which forms a thin fluid film between sleeve member 153 and circumferential portion 157 on shaft 155. As wheel 137 rides up and down following the contour of negative 41, cam follower 141 is displaced to the right or the left, respectively, against its spring biasing so as to impart a lateral movement to sleeve member 153 with respect to fixed damper shaft 155. The length of the thin fluid film maintained between the internal surface of sleeve 153 and the larger circumferential portion 157 of damper shaft 155 determines the damping coefficient of the damper, thereby regulating the damping or dragging action of the shaft on spool 42.

Having described the loop storage system for negative 41 and duplicating material 61, the mechanism for transporting them to and from the gate will now be considered. FIGURE 10 illustrates the gear train for driving and braking capstan assemblies 46 and 81 which operate on a vacuum principle in a manner which will become apparent. Capstan assembly 46 of the negative transport system has a motor 171 which drives a vacuum capstan 173 through a reduction gear box 175. Also meshing with the gear drive of motor 171 is an electro-magnetically actuated brake 177 which, when disengaged, runs freely on the drive of motor 171. Also mounted on the shaft of brake 177 is a tachometer 179 for a purpose to be described. In similar fashion, motor 181 of duplicating material transport system drives vacuum capstan 183 through a reduction gear box 185 which is also in engagement with an electromagnetically actuated brake 187 having a tachometer 189 at one end thereof.

The operation of the brake and motor for each of the capstan assemblies is similar so that a discussion of captan assembly 46 should suffice. Upon receipt of a start command from control panel 12, motor 171 causes negative film 41 to be accelerated along a predetermined velocity time curve which rises to a maximum of about 40 inches per second within about .4 second. When a stop command is given, electromagnetic brake 177 is energized by a signal generated to satisfy the equation:

$$\alpha = \omega_0^2 / 2\theta$$

wherein $\alpha$ is equal the constant negative acceleration of negative film 41 that must be applied to magnetic brake 177 to stop the negative precisely after a specified number of revolutions of capstan 173;

$\omega_0$ is equal to the actual angular velocity of the capstan at the stop command;

$\theta$ is equal to the specific number of revolutions of the capstan after the stop command is given.

Since $\theta$ is equal to the number of revolutions of the capstan after the stop command, it also represents the distance from the leading edge of the printing area to a reference point at which the stop command is determined.

A more thorough understanding of the brake control of the film can be had in connection with FIGURE 11. Assuming that a start command 201 has already been given and it is desired to stop the negative at a predetermined place, a stop command 203 may be determined in either of two modes according to settings on control panel 12. The stop command may be predicated upon a frame number counter 205 which counts frame separations by any suitable sensing means, such as by a photosensor 206 shown in FIGURE 4. Alternatively, the stop command may be given from a footage counter 207 which meters the film from a reference datum by any suitable means, such as tachometer 179 connected to the film drive. When stop command 203 is fed into a STOP and START gating circuit 209, a signal is fed to a calculate and remember circuit 211 which solves for the equation $\alpha = \omega_0^2 / 2\theta$ from information received from tachometer generator 213. One of the inputs 217 from circuit 211 represents the actual angular velocity $\omega_0$ of capstan 173 at the stop command. Another output 219 represents the instantaneous angular velocity of the capstan and the third output 221 represents the desired negative acceleration $\alpha$. Signal 219 is inverted by an inverter 223 and signal 221 is integrated in integrator 225 before the outputs are summed up in summation amplifier 227. The output of amplifier 227 is then integrated by integrator 229 and inverted by inverter 231 before being combined with another output from amplifier 227 and negative acceleration signal 221 in summation amplifier 236. The function of summation amplifiers 227 and 236 is to account for errors in angular displacement and velocity and compute for a corrective signal, respectively, which is then applied to magnetic brake 177 across output coil 238. Since the duplicating material cannot be metered by a frame detector, as in the case of negative 41, only the footage counter is employed.

As shown in FIGURES 12 and 13, the transport vacuum capstan 173 is capable of selectively accommodating different film widths and includes an outer foraminous sleeve 241 secured to a pair of annular plates 243 which are rotatably supported on a core member 245. One of plates 243 has a protruding gear 246 which engages the motor and brake gear train previously described. Core member 245 has an outer flat portion 247 from which radially project a plurality of longitudinally extending ribs 249 on which the sleeve is secured. Intermediate each pair of ribs is a radial bore 251 which provides communication between a source of vacuum 252, shown in FIGURE 4, and foraminous sleeve 241 via a conduit 243 and a bore 255 in core member 245. Received partially within the core member 245 is a rotary valve member 257 which has a sleeve portion 258 containing a plurality of apertures 259 spaced coincident with each of radial bores 251. As best shown in FIGURES 13A through 13F, apertures 259 in valve member 257 progressively decrease in number from four to one in the axial direction of the capstan extending away from the source of vacuum 252. Rotary valve member 257 has a stem 261 upon which is mounted a collar 263 for carrying a resilient plunger 265 which is receivable to seat in any of a series of spaced grooves 267 on the end of core member 245. As stem 261 is angularly displaced, the number of apertures 259 of valve member 257 in communication with radial bores 251 are varied to regulate the length of effective vacuum along foraminous sleeve 111. The purpose of plunger 265 and grooves 267 is to accurately position valve member 257 with respect to core member 243 so that apertures 259 are properly aligned with bores 251. Since the length of the effective vacuum can be varied along the length of the capstan, negatives of different widths can be accommodated without any resulting inefficiency. The construction of capstan 183 is similar to that of capstan 173 just described.

In order to compensate for any lateral displacement during transport of negative 41 or duplicating material 61, each of their threading assemblies is provided with an articulated idler tracking assembly which, for purposes of illustration, has been shown only in the negative threading assembly of FIGURE 4 as 52. As best shown in FIGURES 14 and 15, articulated idler tracking assembly 52 comprises a rectangular frame 271 having a slot 273 at one end which is inclined at about 45 degrees to the horizontal. Inside of frame 271 is an idler 275 on a shaft 277, one end of which is received through slot 273 so as to be movable in a plane inclined at an angle of 45 degrees to the horizontal while the other end remains fixed. Connected to shaft 277 on the opposite side of the slot is a displaceable member 279 which is in threaded engagement with a screw shaft 281 driven by a reversible motor 283. Displaceable member 279 is also connected to a guide rod 285. When the film is laterally displaced from the correct position, a signal is generated from a suitable sensing device 282, such as a photocell, to motor 283 which drives displaceable member 279 up or down a predetermined amount to thereby tilt idler shaft 277 in the proper direction and effect a lateral displacement of the negative film 41 along idler 275. It is not important which idler of the threading assembly is articulated since any of them can be articulated in the manner described. In like manner, any of the idlers in the threading assembly for duplicating material 61 may be selected as an articulated idler, and it is intended only that one of them serve as such.

Gate assembly

Negative 41 and duplicating material 61 are threaded into overlying relationship in the area of the gate or printing zone where they may be exposed by a scanning lamp housing assembly 95. The duplicating material is supported in pressure contact with the negative to be reproduced in order to obtain high quality reproduction. A withdrawn length of negative 41 is supported above glass platen 50 which extends horizontally across the framework of the printer. Duplicating material 61 is threaded across parallelogram assembly 71.

As best shown in FIGURES 16–18, parallelogram assembly 71 comprises a pair of spaced apart, horizontal, parallel plates 72 and 73 having U-shaped end plates 76 and 77 pivotally connected thereto by means of elongated pins 303 and 305, respectively. On the opposite sides of U-shaped end plates 76 and 77 are pins 307 and 309, respectively, which pivotally connect the end plates with the framework of the printer. This permits horizontal plates 72 and 73 to be movable via piston and cylinder assembly 93 through linkage 310 in parallel relationship with platen 50 which rests in a rectangular frame 311. Supported by spaced horizontal plates 72 in sliding relation therewith is a pair of bearing housings 313. Plates 72 and 73 terminate in a rounded surface which is received by a recess in the bearing housing in a ball and socket relation. Connected to each of housings 313 is a plate 315 which supports freely rotatable shaft 317 on which bag member 91 is secured.

Positioned below platen 50 is lamp house assembly 95 which is supported on internally threaded ball nut 96 that receives a rotatable screw 97. As best shown in FIGURE 18, a pair of parallel ways 321 on the printer frame guide lamp house assembly 95 during the course of its movement by engagement with recessed bearing housings 323 fixed to lamp house assembly 95 in a ball and socket relation similar to that already described. Mounted on each of bearing housings 323 is a vertical spindle 325 which is slidably received through an opening in bearing housings 313. When motor 101 drives screw member 97, causing lamp house assembly 95 to travel in a horizontal direction, bag member 91 is carried along with it due to the interaction between spindles 325 and bearing housings 313 to which are fixed plates 315 that support shaft 317 of bag 91. Also when piston and cylinder assembly 93 is actuated to raise parallel plates 72 away from lamp house assembly 95, bag 91 is able to ride up and down on vertical spindles 325.

The bag 91 can comprise any suitable resilient material capable of being pneumatically inflated and in a preferred embodiment comprises a transparent elastic plastic skin 327, such as polyvinyl chloride, which is sealed to a pair of apertured end discs 329. Discs 329 support the outer race of ball bearings 331 that have an inner race mounted on shaft 317 of bag 91. The bag is colored red for a purpose to be described. So that bag 91 can be rolled across the length of the gate codirectionally with lamp house assembly 95 in pressure contact with the films, a sufficient length of tubing 333 is connected to it from a suitable source of air pressure 334, shown in FIGURE 4. Desirably, air is supplied through a suitable valve which maintains the bag under a constant pressure of approximately 6 p.s.i.g. while the machine is in operation. The purpose of rolling air bag 91 is to create highly uniform unit pressure contact between negative 41 and duplicating film 61 during exposure.

As best shown in FIGURE 16, at the far end of the printing gate and in line with lamp house assembly 95 are travel limit switches SW1 and SW2. Also there is mounted on one of pins 307 which connect end plate 76 with the frame, a pair of rotary cams 335 and 337 for actuating limit switches SW3 and SW4, respectively, to indicate whether parallelogram assembly 71 is in the raised or lowered position. The purpose of switches SW1, SW2, SW3, and SW4 is to control the operation of scanning lamp house assembly 95 in conjunction with parallelogram assembly 71 in a manner to be described. As can be readily appreciated, when the machine is ready to print, parallel plates 72 are in the lowermost position and duplicating material 61 is maintained by means of the pneumatic bag 61 in pressure contact against negative 31.

Exposure control system

After negative 41 and duplicating material 61 have been properly positioned in the printing gate, they are exposed through an aperture slit 104 in lamp house assembly 95 which scans the contacting films under platen 50. The lamp house assembly contains an intensity modulated exposing light source and a high spectrum wavelength sensor source which simultaneously scan the films held in contact by air bag 91 through the slit aperture at a constant rate. In synchronism with the lamp house assembly there is an array of photosensors contained in bag member 91 which scan directly above the platen. As the sensor source illuminates the aperture slit, the density of negative 41 attenuates the energy and the photosensors detect the transmitted energy and transform it into an electrical signal. After these signals are amplified, the largest and smallest sensor currents representing the minimum and maximum negative density, respectively, are used to compute the intensity to which the exposing source is adjusted in a manner which will become apparent.

Figure 20:
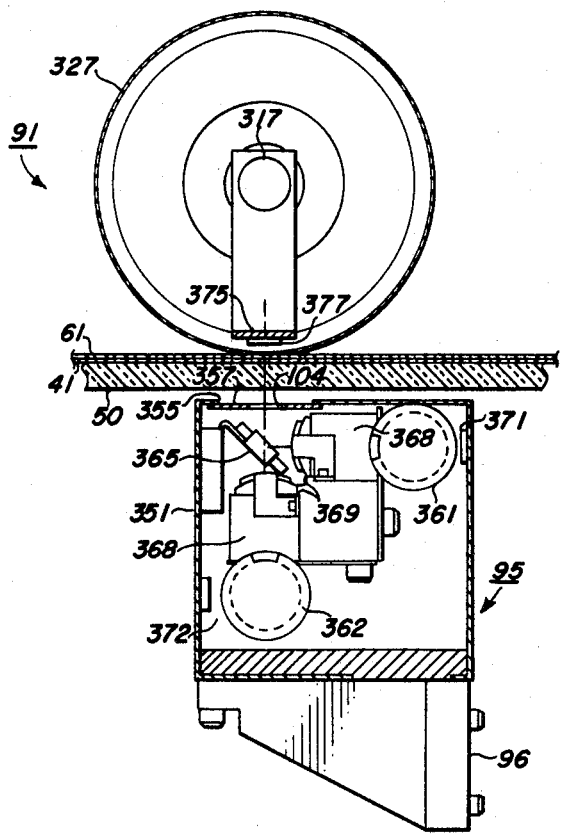
FIGURE 20 is another sectional view of the lamp house assembly taken along line 20—20 of FIGURE 17.

As shown in FIGURES 19 and 20, lamp house assembly 95 comprises a housing 351 formed by contiguous walls. The top wall of housing 351 has an opening 355 which is covered by a plate 357 that contains an aperture slit 104. The length of aperture slit 104 is adjustable by positioning a pair of end plates 358 by means of set screws 359. Supported in lengthwise relation by the end walls of housing 351 is a cylindrical exposing lamp 361 in the upper portion thereof and a cylindrical sensing lamp 362 in the lower portion thereof. Each of these lamps is parallel to the lengthwise walls of the lamp house assembly and extends transverse to the length of platen 50 to approximately the same length as housing 351. Any suitable light source that has an output falling within the spectral region to which the duplicating material 61 is sensitive may be used for exposing lamp 361. A fluorescent aperture lamp containing a "black light" (BL) phosphor which has a spectral distribution ranging from about 3,000 to 5,000 angstroms has been found to work well in the case of aerographic duplicating films. For maximum efficiency, lamp 361 has a clear aperture of about 30 degrees in the desired direction of emission. A dichroic mirror 365 is optically opsitioned to receive and reflect the ultraviolet light emanating from lamp 361 through slit 104 in plate 357 of the lamp house assembly. Sensing lamp 362 desirably has an output beyond the spectral sensitivity of duplicating film 61 for reasons which will become apparent. Any suitable lamp having a radiation above about 6,000 angstroms may be used. Typical light sources are a red fluorescent aperture lamp and a red tungsten lamp with a suitable reflector. Light emission from red sensing lamp 362 is also directed toward dichroic mirror 365 which conducts the lights so as to superimpose the red sensing light with the ultraviolet exposing light through aperture slit 104. A honeycomb structure 368 and lens 369 are positioned between each of the lamps and dichroic mirror 365 so that the light may first be collimated and then projected onto the surface of the dichroic mirror before passing through aperture slit 104. Also located in lamp house assembly 95 are light sensors 371 and 372 used for detecting the present intensity of ultraviolet exposing lamp 361 and red sensing lamp 362, respectively, for a purpose to be described. Any photovoltaic cell suitable for electronic servo loop applications can be used. Typical photovoltaic cells are the Edgerton, Germeshhausen and Greir SD–100, and the Texas Instruments SIV–7100.

As already mentioned, air bag 91 containing an array of light sensors moves in synchronization with lamp house assembly 95. As shown in the figures, the shaft of rolling air bag 91 is parallel and directly aligned with aperture slit 104 and supports a bar 375 to which are connected an array of light sensors 377 similar to those described in lamp house assembly 95. Each of the light sensors 377 is a thin wafer having a square cross-section which is desirably smaller than the opening of aperture slit 104. Sensors 377 are arranged in a single row parallel to and opposite the aperture slit.

Each of the light sensors 377 detects the intensity of the red sensing light passing through bag 91 corresponding to a quantity of sensing light being transmitted through an incremental area of square cross-section in the negative at each instant of scan. The material of air bag 91 is colored red so that the ultraviolet exposing light from lamp 361 is filtered out and only the red sensing light from lamp 362 is permitted to pass through to sensors 377. The light detected by sensors 377 is then converted to electrical signals which are separated into two discrete signals representing the maximum and minimum density of negative 41. These signals are then modified by constants based on the information transfer desired for the useful exposure latitude of duplicating material 61. At the same time, the two signals are compared with a reference signal from red light sensor 373 in lamp house assembly 95, and a weighted density, $Dn$, is derived representative of the incremental area defined by the opening of aperture slit 104. This information is then delivered to a summation amplifier together with the exposure for maximum resolution of the duplicating film, $\log E_D$, modified as desired for either overexposure or underexposure, the exposure time, $\log T$, as derived from the scan velocity and aperture slit and a reference signal, $\log I$, indicating the intensity of exposing lamp 361, as determined by light sensor 372 in lamp house assembly 95. The resulting output of the summation amplifier satisfies the equation $$\log I + \log T - Dn - \log E_D = 0$$

and serves as an error signal used to modulate the intensity of exposing lamp 361. In this manner, continuous exposure control is exercised over the area defined by aperture slit 104 as the lamp housing assembly scans the contacting films from below platen 50.

Figure 21:
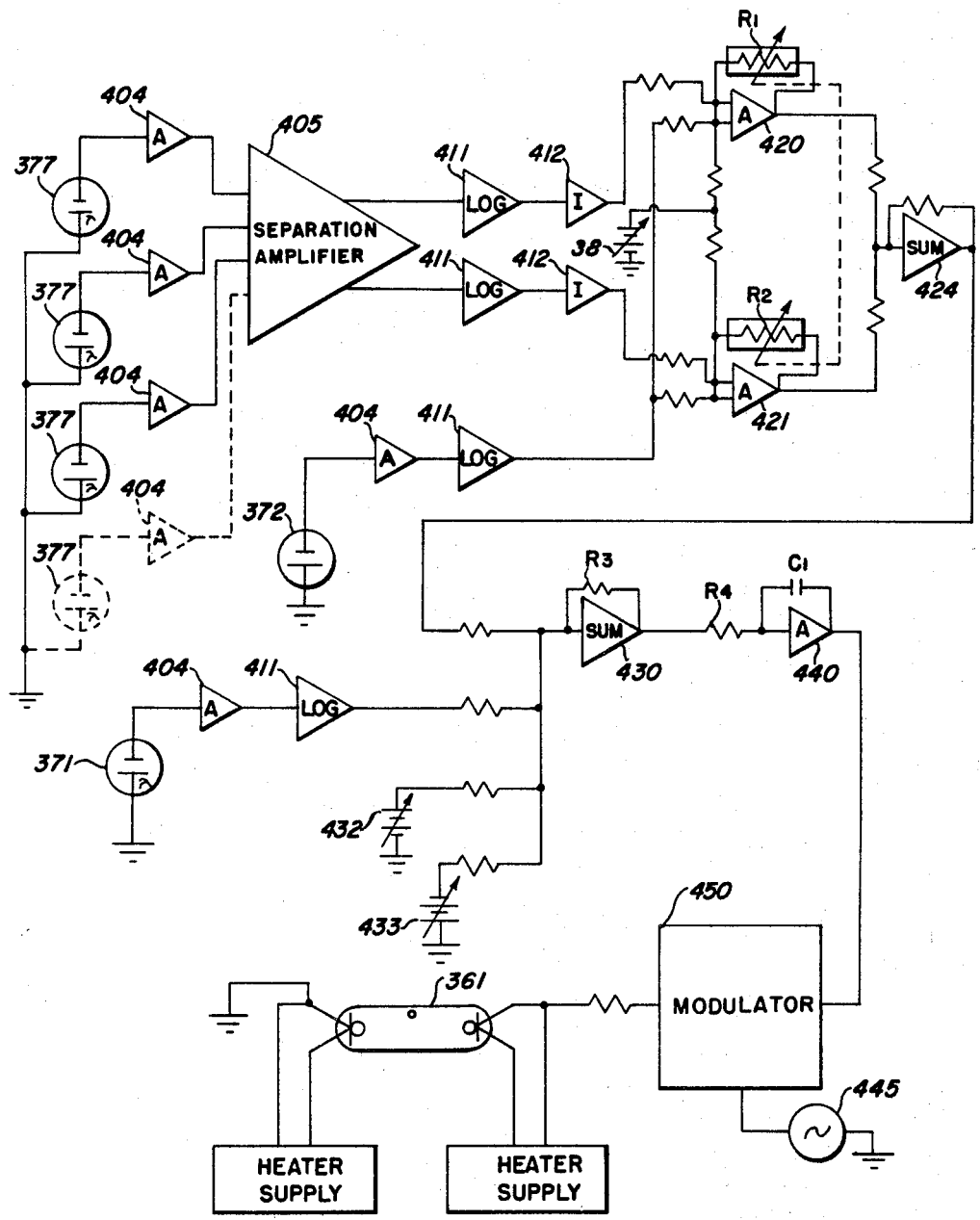
FIGURE 21 is a block diagram illustrating the exposure control system.

A more thorough understanding of the exposure control system can be had in connection with FIGURES 21 and 22. As shown in FIGURE 21, a signal is generated by each of the light sensors 377 which is proportional to the red sensing light passing through the air bag 91. Each of these signals is converted to an amplified voltage in D.C. amplifiers 404 before being fed into separation amplifier 405, which is best shown in FIGURE 22. The function of separation amplifier 405 is to provide two outputs, one corresponding to the maximum signal detected by sensors 377 and the other corresponding to the minimum signal detector by sensors 377. In separation amplifier 405, each of the voltage inputs is fed into a pair of transistors $Q_1$ and $Q_2$ which are of the PNP and NPN types, respectively. The most positive signal will cause a corresponding $Q_2$ to conduct causing the remaining $Q_2$ transistors to cut off. The maximum output signal is then equal to the most positive signal plus or minus the difference in the base emitter voltage drops between $Q_B$ and the conducting $Q_2$. In like fashion, the minimum output signal would be equal to the most negative signal plus or minus the difference in the base emitter voltage drops between $Q_A$ and $Q_1$. Both the maximum signal and minimum signal are then converted into a $\log_{10}$ voltage by log amplifiers 411. Since the outputs from logarithmic amplifiers 411 produce a negative log, these signals are inverted by unity gain D.C. amplifiers 412. The outputs of amplifiers 412 are each combined with a reference signal corresponding to the intensity of red sensing light 362 in the lamp house assembly as detected by light sensor 372 which is later converted to a $\log_{10}$ voltage, and another voltage signal 416 which is proportional to the $\log_{10}$ voltage of the transmission of the gate assembly in a pair of operational amplifiers 420 and 421 which have external resistances $R_1$ and $R_2$, respectively. As can readily be appreciated, the gain of operational amplifiers 420 and 421 are determined by the ratio of resistance $R_1$ and $R_2$, respectively, to the loads of the various inputs to each of the amplifiers. The function of resistors $R_1$ and $R_2$ is to modify the density information signals obtained by light sensors 377 according to the developing characteristics of the duplicating film being used. Thus, if it is desired to emphasize the negative information in the lower density area on the duplicating film, resistors $R_1$ and $R_2$ are adjusted simultaneously from a single selector 36 on the control panel to modify the density signals derived from light sensors 377. The outputs from feedback amplifiers 420 and 421 are then combined together in another feedback amplifier 424 to obtain a voltage signal corresponding to the weighted density, $Dn$, that should be exposed in aperture slit 104 of lamp house assembly 95. At the same time, the existing intensity of exposing lamp 361, as determined by light sensor 372 in lamp house assembly 95, is converted to a $\log_{10}$ voltage 426 by amplifiers 404 and 406 in a manner described above. The latter signal is combined with the output of amplifier 424 in summation feedback amplifier 430 together with a signal input voltage 432 which is proportional to the $\log_{10}$ of the lamp house scan time and another signal input voltage 433 which is proportional to the $\log_{10}$ of the desired exposure to duplicating film 61. By varying the potential of signal 433 by selector 37 on control panel 12, it is possible to either overexpose or underexpose the duplicating film as desired. As can be readily appreciated, the gain of feedback amplifier 430 is determined by the ratio of its feedback resistance $R_3$ with the loads represented by the various input signals to the amplifier. The output of amplifier 430 is then integrated by resistor $R_4$, capacitor $C_1$, and amplifier 440 so as to obtain a varying D.C. voltage level for modulating a signal generator 445 in a modulator 450 that drives exposing lamp 461. Signal generator 445 is operated at a frequency of at least 10 kc. to obtain maximum modulation transfer.

Of special significance in the exposing and exposure control system described above is that the only area exposed is that increment of duplicating material 61 in pressure contact with negative 41 below rolling air bag 91. Since the ultraviolet exposing light from lamp 361 is filtered out by the red colored air bag, there is no opportunity for the ultraviolet light to scatter onto the surface of the unexposed duplicating film thereby causing a distortion in the image. This scattering effect, sometimes referred to as Newton fringes or rings, is obviated by the rolling contact of the filtering air bag 91 with duplicating material 61. The width of aperture slit 104 in plate 357 may vary with the film width of the negative or a single slit may suffice for all film widths. Typical slit widths range from about ⅛ to ½ inch for 70 mm. to 9½ inch film widths, respectively.

*General operation*

The machine is turned in the ON position by depressing button switch 18. After standby button 19 lights up, the particular frame on the negative to be reproduced is advanced to the printing zone. This is accomplished in either of two modes of operation. For manual operation, lever 24 on control panel 12 is used to position the negative manually with the visual aid provided by viewer 14. The lever functions as a potentiometer across drive motor 171 and has a spring return to center position from which a signal is generated to brake 177. By displacing the lever to the right or left, a signal is generated to motor 171 of negative capstan assembly 46 moving the negative in the wind and rewind directions, respectively. The extreme right and left positions provide maximum velocity in the desired direction. For automatic operation, search/repeat counter 31 is set for the desired footage or frame number desired and a search button 33 depressed thereby moving negative 41 until counter 26 reaches zero. Whether the negative frame, automatically positioned, shall be metered in feet or number of frames is determined by depressing either of negative footage button 28 or frame button 29. Also, the characteristics desired to be reproduced on the duplicating film type are set in on selector 38 and the desired exposure on selector 39. Now the machine is ready for operation and selector 23 on the control panel is set for the number of prints desired and print button 36 is depressed, thereby causing the negative to advance to the printing zone and stop. At the same time, bag 91 is inflated from air source 334. If it is desired to print consecutive negative frames, search/repeat counter 31 is reset accordingly and both consecutive print button 35 and print button 36 are depressed. The sequence of operations that follow may best be understood with the circuit diagram of FIGURE 23. Upon depression of print button 36, a solenoid SOL-1 closes a relay K-1 energizing another solenoid SOL-2 which actuates an air valve to extend piston and cylinder assembly 92 thereby positioning parallelogram assembly 71 in the lowered or closed position. This causes negative 41 and duplicating material 61 to be urged in pressure contact against platen 50 under the force exerted by bag 91. When the parallelogram assembly is in the closed position, rotary cam actuated switch SW3 is closed, thereby actuating SOL-3 which closes relay K-2. After relay K-2 closes, this energizes SOL-4 on brake 68 which is spring actuated so as to be released when energized. At the same time, relay K-2 energizes MOT-1 on motor drive 67 so as to cause screw 66 to rotate and drive lamp house assembly 95 in the direction of scan which is away from capstan assemblies 46 and 81 and thereby close normally open limit switch SW2. At the end of the scan, lamp house assembly 95 trips normally closed limit switch SW1 open which deenergizes relay K-1 and relay K-2. This in turn causes SOL-2, SOL-4, MOT-1 to be deenergized. At the same time, piston cylinder assembly is retracted to a raised position causing brake 102 to become engaged and motor 101 to stop.

Upon parallelogram assembly 71 being raised to the open position at the completion of exposure, rotary cam operated switch SW4 is closed thereby energizing SOL-5 which closes relay K-3. This in turn causes SOL-4 and MOT-1 to be energized so as to release brake 68 and start motor 67, which now rotates in a reverse direction to return lamp house assembly 95 to the original starting position. When this occurs, lamp house assembly 65 trips switch SW2 open which deenergizes relay K-3 thereby removing power from motor 67 and brake 68. The machine is now ready for another exposure cycle which is determined by the number of prints to be produced for each particular negative.

By the apparatus thus described there is disclosed a transport for photographic materials admirably suited for the mass production of high quality prints from negative film rolls. As can be readily appreciated, the storage loop maintained at each end of the transport enables the photographic materials to undergo high rates of acceleration without incurring undue stresses as experienced heretofore. Hence the prints produced from the materials are of the highest possible quality since there is no distortion of the image. Furthermore, it should not be overlooked that the photographic materials are given minimal contact during transport so as not to scratch or otherwise damage them. Thus, it is apparent that with the teaching of the invention, high quality, high resolution prints can be obtained from roll film negatives on a mass production basis.

While the present invention, as to its objects and advantages as described herein, has been carried out in a specific embodiment thereof, it is not desired to be limited thereby, but it is intended to cover the invention broadly within the spirit and scope of the appended claims.

What is claimed is:

1. In a contact printer device, apparatus for transporting web material to and from a printing zone, said transport apparatus comprising in combination, a first storage assembly containing a quantity of web material to be transported to said printing zone and a second storage assembly to receive said web material transported from said printing zone, each storage assembly including, storage roller means to support a quantity of elongated web material wound thereon, tension sensing means engaging a drawn portion of said web from said storage roller means for urging said web into an offset loop to effect a predetermined tension thereon and responsive to a change in tension force on said web material to issue a discrete electrical signal indicative thereof, drive means connected to said storage roller means and operative in response to a signal from said sensing means to effect rotation thereof in a direction to restore the web material to a predetermined tension force, and damping means operatively connected to said storage roller means for maintaining a drive load on said storage roller means in proportion to the angular velocity of said storage roller means;

capstan means engaging the web material extending between said first storage assembly and said second storage assembly and adapted when driven to transport the web from said first toward said second storage assembly, and drive means operatively connected to said capstan means and adapted to drive said capstan means and said web in response to a predetermined signal.

2. Apparatus according to claim 1 wherein said tension sensing means includes at least one idler roller member mounted for rotation about a shaft and normally biased into engagement with said offset loop to effect a predetermined tension on said web, guide means supporting said idler roller member and adapted to permit linear movement therealong in response to a change in tension in the web, and signal emitting means responsive to movement of said idler roller member along said guide means.

3. Apparatus according to claim 2 wherein said signal emitting means comprises a variable voltage generating means adapted to respond to linear displacement of said idler roller member along said guide means.

4. Apparatus according to claim 3 wherein the output of said voltage generating means produces an electrical signal to directionally actuate said drive means until a predetermined tension in said web is restored.

5. Apparatus according to claim 1 wherein said damping means includes,
a fluid filled housing,
sleeve means disposed within said housing in sliding engagement therewith,
rotatable shaft means coaxially received by said sleeve means to define a thin fluid film therebetween, one end of said shaft means being operatively connected with said storage roller drive means, and
means responsive to the quantity of web material wound on said storage roller means to displace said sleeve means whereby to vary the length of said thin fluid film.

6. In a system of the type wherein web material is transported to and from a reference station, apparatus for transporting said web material comprising in combination,
means defining a path of travel over which said web material is transported including capstan means for engaging the web material and adapted when driven to transport said web past said reference station,
drive means operatively connected to said capstan means and adapted to drive said capstan means in response to a predetermined signal,
first storage assembly means adapted for supporting a quantity of web material to be transported to said reference station, and
second storage assembly means adapted to support a quantity of web material transported from said reference station, said first and second storage assembly means including,
storage roller means to support a quantity of elongated web material wound thereon,
guide roller means engaging a portion of said web drawn from said storage roller means and forming said web into an offset loop,
guide roller support means extending longitudinally in the direction of said offset loop for providing a path of translative movement along which said guide roller means is displaceable as said web is transported,
means normally biasing said guide roller means into said offset loop in an initial condition to thereby induce a predetermined tension in said web material,
sensing means responsive to translation of said guide roller means and operative to produce a discrete electrical signal in response to a change in the quantity of web material in said offset loop as the web is transported,
reversible drive means connected to said storage roller means and operative in response to a signal from said sensing means to effect rotation thereof in a direction to restore the quantity of web material in said offset loop to the initial condition, and
damping means connected to said storage roller means and operative for maintaining a drive load on said storage roller means in proportion to the angular velocity of said storage roller means.

7. Apparatus according to claim 6 wherein said damping means includes,
a fluid filled housing,
sleeve means disposed within said housing in sliding engagement therewith,
rotatable shaft means coaxially received by said sleeve means to define a thin fluid film therebetween, one end of said shaft means being operatively connected with said storage roller drive means, and
means responsive to the quantity of web material wound on said storage roller means to displace said sleeve means whereby to vary the length of said thin fluid film.

8. Rotational damping apparatus comprising in combination,
a fluid filled housing,
shaft means rotatably mounted in said housing,
sleeve means disposed within said housing coaxial with said shaft means to define a thin fluid film therebetween, said sleeve means being axially movable along said shaft means to vary the thin fluid film length therebetween whereby to vary the damping coefficient, and
means restraining said sleeve means against rotation with said shaft means whereby to provide a rotational damping force acting on said shaft means proportional to the angular velocity of said shaft means.

9. Apparatus according to claim 8 further including,
roller means connected to said shaft means external to said housing and adapted to support a quantity of material wound thereon,
sensing means engageable with said roller means and operable to sense the quantity of material wound thereon, and
means operatively connecting said sensing means and said sleeve means to axially displace said sleeve means along said shaft means responsive to the quantity of material sensed.

10. In a system for withdrawing quantities of a wound web from a rotatable driven support, a damping apparatus for maintaining the drive load of the support substantially constant with changes in web mass thereon, said damping apparatus comprising in combination,
a fluid filled housing,
sleeve means disposed within said housing in sliding engagement therewith,
rotatable shaft means coaxially received by said sleeve means to define a thin fluid film therebetween, one end of said shaft means being operatively connected with the drive of said web support, and
means responsive to the changing mass of web material wound on said support to linearly displace said sleeve means and vary the length of said thin fluid film whereby the driving load on the web support remains substantially unchanged.

11. A damper apparatus according to claim 10 wherein said last recited means includes a cam wheel positioned to engage the web material on its support to follow the changing mass thereon.

References Cited

UNITED STATES PATENTS

| | | | |
|---|---|---|---|
| 1,706,165 | 3/1929 | Hull | 242—75.51 |
| 2,627,103 | 2/1953 | Jennings | 242—75.45 X |
| 2,638,285 | 5/1953 | MacQuarrie | 242—75.53 |
| 2,813,601 | 11/1957 | DeBourgues | 242—75.45 X |
| 3,115,314 | 12/1963 | Manley | 242—55.12 |
| 3,243,138 | 3/1966 | Nilsson | 242—75.45 |
| 3,228,494 | 1/1966 | Rumsey | 188—90 |

M. HENSON WOOD, JR., *Primary Examiner.*

R. A. SCHACHER, *Assistant Examiner.*